United States Patent
Seki et al.

(10) Patent No.: US 9,422,668 B2
(45) Date of Patent: Aug. 23, 2016

(54) SHEET MANUFACTURING APPARATUS AND SHEET MANUFACTURING METHOD

(71) Applicant: SEIKO EPSON CORPORATION, Tokyo (JP)

(72) Inventors: Shunichi Seki, Nagano (JP); Yoshiaki Murayama, Nagano (JP); Katsuhito Gomi, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/658,512

(22) Filed: Mar. 16, 2015

(65) Prior Publication Data

US 2015/0275435 A1    Oct. 1, 2015

(30) Foreign Application Priority Data

Mar. 25, 2014   (JP) .................. 2014-061554

(51) Int. Cl.
 *D21H 17/20* (2006.01)
 *D21H 11/14* (2006.01)
 (Continued)

(52) U.S. Cl.
 CPC .................. *D21H 17/20* (2013.01); *D21B 1/06* (2013.01); *D21C 5/022* (2013.01); *D21F 9/02* (2013.01); *D21H 11/14* (2013.01); *Y02W 30/642* (2015.05); *Y02W 30/648* (2015.05)

(58) Field of Classification Search
 CPC ............. D21D 5/24; D21D 5/00; B27N 3/04; B27N 3/12; D21H 11/14; D21H 25/005; D21H 3/00; D21H 23/06; D21H 17/20; D04H 1/732; D04H 1/60; A61F 2013/530007; B07B 9/00; B07B 1/00; D21F 9/00; D21F 11/00; D21F 3/04; D21F 7/00; D21F 7/003; D21F 9/04; D21C 5/025; D21C 5/02; D21C 5/022; D21B 1/08; D21B 1/028; D21B 1/063; D21B 1/32; D21B 1/06; D21G 9/0027; D21G 9/0018; B65H 2301/121; B65H 2801/84

See application file for complete search history.

(56) References Cited

U.S. PATENT DOCUMENTS 7,037,394 B2 *   5/2006   Christensen .............. D21F 9/00
                                                                       156/62.2
8,882,965 B2 *  11/2014   Yamagami ............... D21B 1/08
                                                                       162/261

(Continued)

FOREIGN PATENT DOCUMENTS

JP        10-121400 A           5/1998
JP     2012144819 A  *       8/2012

(Continued)

*Primary Examiner* — Jose Fortuna

(74) *Attorney, Agent, or Firm* — Global IP Counselors, LLP

(57) ABSTRACT

A sheet manufacturing apparatus includes: a defibrating unit which defibrates a raw material including at least fibers; an addition unit which adds an additive agent to a defibrated material which is defibrated in the defibrating unit; and a sheet forming unit which forms a sheet by bonding the plurality of fibers to each other via the additive agent. According to a history of the raw material, an amount of the additive agent which is fed by the addition unit varies. In addition, there is provided a sheet manufacturing method, including: defibrating the raw material which includes at least fibers; adding the additive agent to the defibrated material; and bonding the plurality of fibers to each other via the additive agent. According to the history of the raw material, a feed amount of the additive agent with respect to the raw material varies.

10 Claims, 4 Drawing Sheets

(51) Int. Cl.
*D21C 5/02* (2006.01)
*D21B 1/06* (2006.01)
*D21F 9/02* (2006.01)

(56) References Cited

U.S. PATENT DOCUMENTS

| | | | | |
|---|---|---|---|---|
| 9,039,868 | B2* | 5/2015 | Nagai | D21H 25/04 162/252 |
| 9,045,860 | B2* | 6/2015 | Seki | D21F 9/00 |
| 9,074,320 | B2* | 7/2015 | Gomi | D21F 3/08 |
| 9,194,081 | B2* | 11/2015 | Yamagami | D21B 1/08 |
| 2002/0066517 | A1* | 6/2002 | Mosgaard Christensen | D21F 9/00 156/79 |
| 2014/0027075 | A1* | 1/2014 | Yamagami | D21B 1/08 162/4 |
| 2014/0290884 | A1* | 10/2014 | Yamagami | D21H 23/06 162/158 |
| 2014/0290886 | A1* | 10/2014 | Nagai | D21H 25/04 162/252 |
| 2014/0290887 | A1* | 10/2014 | Gomi | D21B 1/063 162/252 |
| 2014/0290888 | A1* | 10/2014 | Gomi | D21D 5/24 162/254 |
| 2014/0290889 | A1* | 10/2014 | Oguchi | B07B 1/00 162/259 |
| 2014/0290890 | A1* | 10/2014 | Seki | D21F 9/00 162/261 |
| 2014/0374047 | A1* | 12/2014 | Yamagami | D21B 1/08 162/261 |
| 2015/0096701 | A1* | 4/2015 | Higuchi | B02C 4/10 162/261 |
| 2015/0096702 | A1* | 4/2015 | Higuchi | D21D 5/24 162/261 |
| 2015/0096703 | A1* | 4/2015 | Fujita | D65H 29/125 162/286 |
| 2015/0096705 | A1* | 4/2015 | Fujita | D21F 9/00 162/348 |
| 2015/0096706 | A1* | 4/2015 | Gomi | D21F 3/08 162/358.1 |
| 2015/0176204 | A1* | 6/2015 | Miyazawa | B07B 9/00 162/263 |
| 2015/0176205 | A1* | 6/2015 | Nakamura | D21B 1/063 162/261 |
| 2015/0184341 | A1* | 7/2015 | Tanaka | D21F 7/00 162/252 |
| 2015/0204015 | A1* | 7/2015 | Gomi | D21F 9/00 162/261 |
| 2015/0240417 | A1* | 8/2015 | Higuchi | D21B 1/06 162/261 |
| 2015/0275429 | A1* | 10/2015 | Higuchi | D21F 11/00 162/261 |
| 2015/0275430 | A1* | 10/2015 | Higuchi | D21F 9/04 162/261 |
| 2015/0275435 | A1* | 10/2015 | Seki | D21H 17/20 162/5 |

FOREIGN PATENT DOCUMENTS

| | | | |
|---|---|---|---|
| JP | 2012144825 A | * | 8/2012 |
| JP | 2012144826 A | * | 8/2012 |
| JP | 20150137437 A | * | 7/2015 |

* cited by examiner

FIG. 4

| | SUPPLYING UNIT | | MIXING UNIT | | | SHEET FORMING UNIT | |
|---|---|---|---|---|---|---|---|
| | RAW MATERIAL | NUMBER OF TIMES OF RECYCLING | DEFIBRATED MATERIAL | RESIN FEEDING UNIT | FIBER FEEDING UNIT | GENERATED MATERIAL | NUMBER OF TIMES OF RECYCLING |
| MAKING RAW MATERIAL | PRINTED WASTE PAPER SHEET | 0 | 100 PARTS BY WEIGHT OF FIBERS | 15 PARTS BY WEIGHT OF RESIN | — | COPY PAPER SHEET FOR BUSINESS | 1 |
| EXAMPLE 1 | PRINTED WASTE PAPER SHEET | 1 | 100 PARTS BY WEIGHT OF FIBERS | 10 PARTS BY WEIGHT OF RESIN | — | COPY PAPER SHEET FOR BUSINESS | 2 |
| EXAMPLE 2 | PRINTED WASTE PAPER SHEET | 2 | 95 PARTS BY WEIGHT OF FIBERS | 10 PARTS BY WEIGHT OF RESIN | 5 PARTS BY WEIGHT OF FIBERS | COPY PAPER SHEET FOR BUSINESS | 3 |

SHEET MANUFACTURING APPARATUS AND SHEET MANUFACTURING METHOD

BACKGROUND

1. Technical Field

The present invention relates to a sheet manufacturing apparatus and a sheet manufacturing method.

2. Related Art

In the related art, in a sheet manufacturing apparatus, a so-called wet type method of feeding a raw material including fibers into water, disintegrating the material mainly by a mechanical operation, and repulping, is employed. A sheet which is manufactured by the wet type sheet manufacturing method, has a structure in which cellulose fibers which are derived from wood or the like are intertwined with each other, and are partially bonded by a bonding force, such as hydrogen bonding.

In addition, as a manufacturing method of a waste paper sheet or a fiber board which uses paper-manufacturing waste, such as pulp waste, screening waste, or cleaner waste, which is generated when waste paper sheets or the like are disintegrated, as a raw material (pulp raw material), for example, JP-A-10-121400 discloses a method of forming into a predetermined shape by heating and pressing a raw material mixture which is made up to contain 2% by weight to 20% by weight of plastic on a dry weight basis and 10% by weight to 30% by weight of a dry type defibrated raw material (fibrous material), which is made by making a paper sheet or a wood material have a fibrous form by a dry method, on a dry weight basis, by using at least one of types of paper sheets, such as waste paper sheets and the paper-manufacturing waste as a main component.

According to this method, when the raw material of the fiber board has a plastic content at a proportion in which a proportion of plastic in the raw material mixture exceeds a predetermined range, the proportion of plastic in the raw material mixture is brought within the predetermined range by removing a part of plastic in the raw material of the fiber board. In addition, when the raw material of the fiber board has a plastic content at a proportion in which the proportion of plastic in the raw material mixture is below the predetermined range, additional plastic is added so that the proportion of plastic in the raw material mixture is within the predetermined range.

However, in JP-A-10-121400, there is no specific description allowing understanding of how much plastic is contained in the raw material of the fiber board. For this reason, even those skilled in the art cannot realize adjustment of the proportion of plastic to a predetermined proportion. For this reason, the proportion of plastic in this method is inevitably in a wide range of 2% by weight to 20% by weight, and when the proportion of plastic is in such a wide range, strength of the manufactured sheet is not constant, and for example, there is a possibility that a sheet which has extremely insufficient strength may be manufactured.

In addition, a manufacturing method of a desired sheet by recycling waste paper sheets plural times has not been suggested until now.

SUMMARY

An advantage of some aspects of the invention is to provide a sheet manufacturing apparatus and a sheet manufacturing method, in which it is possible to manufacture a sheet including a desired amount of an additive agent which is in the sheet that has been recycled plural times.

The invention can be realized in the following forms or application examples.

(1) According to an aspect of the invention, there is provided a sheet manufacturing apparatus, including: a defibrating unit which defibrates a raw material including at least fibers; an addition unit which adds an additive agent to a defibrated material which is defibrated in the defibrating unit; and a sheet forming unit which forms a sheet by bonding a plurality of fibers to each other via the additive agent. According to a history of the raw material, an amount of the additive agent which is fed by the addition unit varies.

In this case, depending on the amount of the additive agent which varies according to the history of the raw material, it is possible for the additive agent in the sheet to be set to be of a desired amount.

(2) In the sheet manufacturing apparatus according to the aspect of the invention, the history may be information which corresponds to the number of recycling of the raw material in the past.

In this case, as the amount of the additive agent varies according to the information which corresponds to the number of recycling of the raw material into sheets, even when the amount of the additive agent included in the raw material due to recycling changes, it is possible to set the amount of the additive agent included in the sheet to be manufactured to a desired amount. For example, when the raw material has been recycled twice, the amount of the additive agent included in the defibrated material varies according to the number of times of recycling, but in this manner, it is possible for the additive agent in the sheet to be set to be of a desired amount.

(3) In the sheet manufacturing apparatus according to the aspect of the invention, the amount of the additive agent to be fed may be decreased when the number of times a raw material has been recycled is larger relative to when the number of times a raw material has been recycled is fewer.

In this case, since a raw material which has been recycled a large number of times tends to include a large amount of the additive agent, by decreasing the amount of the additive agent to be fed, there being an excessive amount of additive agent in the sheet is prevented.

(4) The sheet manufacturing apparatus according to the aspect of the invention, may further include a fiber feeding unit which feeds more fibers into the defibrated material which is defibrated in the defibrating unit. An amount of the fibers fed by the fiber feeding unit may be increased when the number of times a raw material has been recycled is larger relative to when the number of times a raw material has been recycled is fewer.

In this case, since a proportion of short fibers included in the raw material which has a larger number of recycling tends to be higher, it is possible to reduce the proportion of short fibers by feeding additional fibers.

(5) The sheet manufacturing apparatus according to the aspect of the invention, may further include: a marking unit which performs marking for displaying the information which corresponds to the number of recycling when the sheet is manufactured; an obtaining unit which reads the marking and obtains the history; and a control unit which controls the feed amount of the additive agent in accordance with the obtained history.

In this case, it is possible to ascertain information regarding the history of the raw material, which corresponds to the number of recycling by using the marking.

(6) According to another aspect of the invention, there is provided a sheet manufacturing method, including: defibrating a raw material which includes at least fibers; adding an additive agent to a defibrated material; and bonding a plurality of fibers to each other via the additive agent. According to a history of the raw material, a feed amount of the additive agent with respect to the raw material varies.

In this case, depending on the amount of the additive agent varies according to the history of the raw material, it is possible for the additive agent in the sheet to be set to be of a desired amount. For example, when the raw material has been recycled twice, the amount of the additive agent included in the defibrated material varies every time recycling is performed, but in this manner, it is possible for the additive agent in the manufactured sheet to be set to be of a desired amount.

(7) According to still another aspect of the invention, there is provided a sheet manufacturing apparatus, including: a defibrating unit which defibrates a raw material including at least fibers; an addition unit which adds an additive agent to a defibrated material which is defibrated in the defibrating unit; a sheet forming unit which forms a sheet by bonding a plurality of fibers to each other via the additive agent; an obtaining unit which obtains history of the raw material; and a control unit which changes a feed amount of the additive agent in accordance with the obtained history.

In this case, since it is possible to change the amount of the additive agent in accordance with the history of the raw material by the control unit, it is possible for the additive agent in the sheet to be set to be of a desired amount.

BRIEF DESCRIPTION OF THE DRAWINGS

The invention will be described with reference to the accompanying drawings, wherein like numbers reference like elements.

FIG. 4 is a table illustrating an additive agent or the like and a regenerated material in each Example.

DESCRIPTION OF EXEMPLARY EMBODIMENTS

Hereinafter, an appropriate embodiment of the invention will be described in detail with reference to the drawings. In addition, the embodiment described below does not unduly limit the contents of the invention described in a range of aspects. In addition, the entire configuration described below is not necessarily essential for configuration requirements of the embodiment.

A sheet manufacturing apparatus according to the embodiment includes: a defibrating unit which defibrates a raw material including at least fibers; an addition unit which adds an additive agent to a defibrated material which is defibrated in the defibrating unit; and a sheet forming unit which forms a sheet by bonding a plurality of fibers to each other via the additive agent. According to a history of the raw material, an amount of the additive agent which is fed by the addition unit of the additive agent with respect to the raw material varies.

In addition, in the specification, in the sheet manufacturing apparatus, with respect to a flow (including a schematic flow) of a material (raw material 1, defibrated material, web W, sheet S, or the like) of the sheet to be manufactured, expressions, such as "upstream" or "downstream", are used. In addition, an expression "upstream side (downstream side)" is used when a position of constituent elements is relatively specified. For example, "A is on the upstream side (downstream side) of B" means that a position of A is upstream (downstream) with respect to a position of B with reference to the flow direction of the material of the sheet S.

In addition, in the specification, a dry method means a method in the atmosphere (in the air) not a method in liquid. In a category of the dry method, a dry state, and a state where liquid (water or the like) which exists as impurities or liquid (water or the like) which is added intentionally, vapor, mist, or the like, exists, are included. In addition, between the dry method and a wet method which is performed by pulp-molding or the like, it should be noted that amounts of water used with respect to the entire apparatus or amounts of paper sheets to be manufactured are completely different in each method. In other words, in the dry method, an amount of water when the water exists in the system is extremely small compared to that in the wet method.

1. SHEET MANUFACTURING APPARATUS

Figure 1:
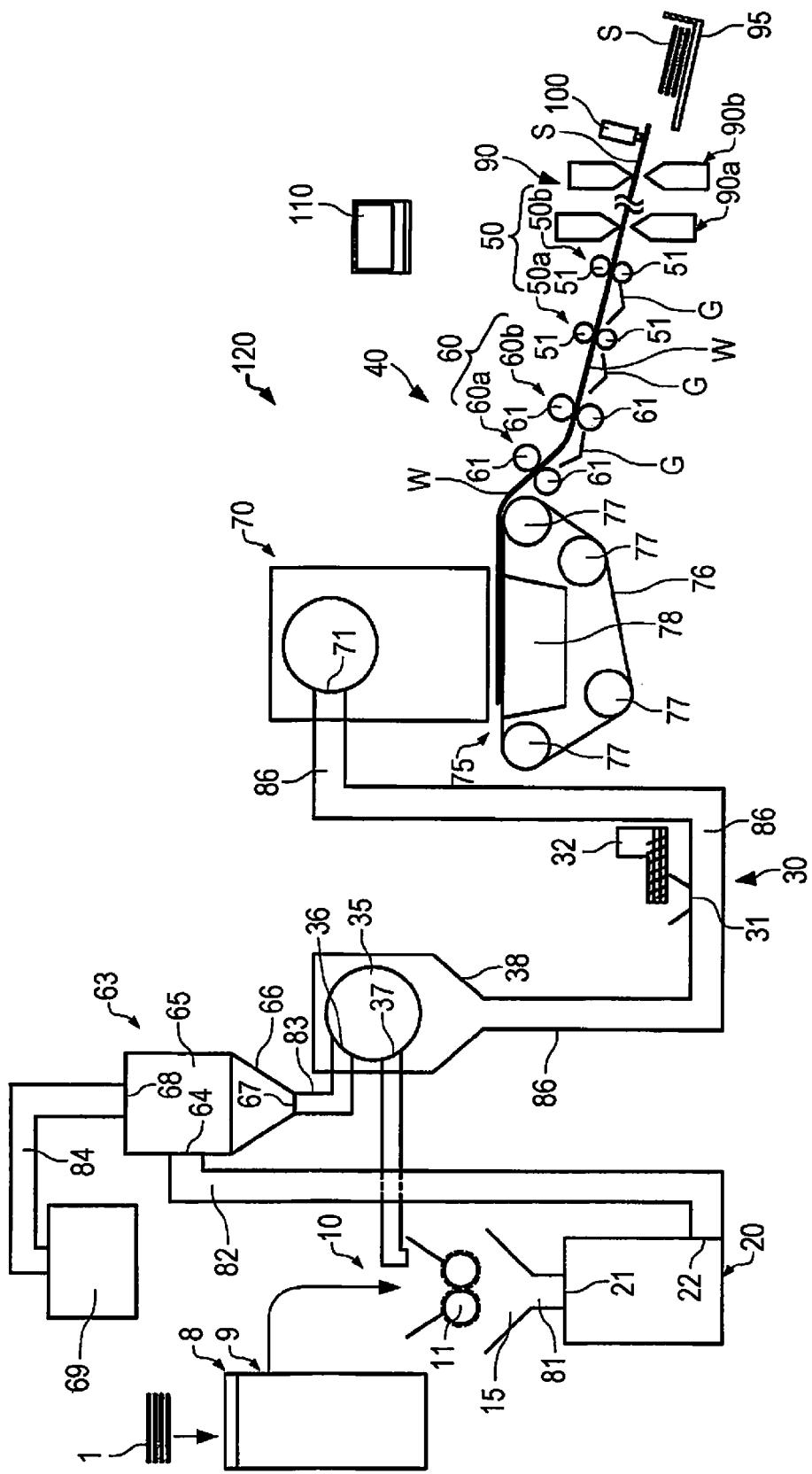
FIG. 1 is a schematic view illustrating a sheet manufacturing apparatus according to an embodiment.

A sheet manufacturing apparatus 120 according to the embodiment includes a defibrating unit 20 which defibrates a raw material 1 which includes at least fibers, an addition unit 32 which adds an additive agent to a defibrated material which is defibrated in the defibrating unit 20, and a sheet forming unit 40 which forms a sheet S by bonding a plurality of fibers to each other via the additive agent. FIG. 1 is a schematic view illustrating the sheet manufacturing apparatus 120 according to the embodiment. Hereinafter, the sheet manufacturing apparatus 120 of the embodiment will be described mainly focusing on the defibrating unit 20 and the addition unit 32.

1.1. Defibrating Unit

The defibrating unit 20 defibrates the raw material 1 which includes at least fibers. By defibrating the raw material 1, the defibrating unit 20 generates defibrated material which is disentangled in a fibrous form. In addition, when the raw material 1 is printed waste paper sheets or the like, the defibrating unit 20 has a function of separating materials, such as resin grains, ink, toner, or a blur-preventing agent, which are adhered to the raw material, from the fibers.

Here, "defibrate" means untangling the fibers in the raw material which is made by bonding a plurality of fibers one by one. The material which passes through the defibrating unit 20 is called "defibrated material". There is a case where examples of the "defibrated material" include materials, such as resin (resin for bonding a plurality of fibers to each other) grains which are separated from the fibers when untangling the fibers, ink, toner, or blur-preventing agent, in addition to the untangled fibers. A shape of the disentangled defibrated material is a string shape or a ribbon shape. The disentangled defibrated material may exist in a state of not being intertwined with other disentangled fibers (a state of being independent), or may exist in a state of being intertwined with other disentangled defibrated material in a massed shape (a state where a so-called "lump" is formed).

The defibrating unit 20 is provided on a further upstream side from a mixing unit 30 which will be described later. Other configuration elements may be provided between the defibrating unit 20 and the mixing unit 30. In addition, other configuration elements may also be provided on an upstream side of the defibrating unit 20.

The defibrating unit 20 is any arbitrary unit as long as the unit has a function of performing the defibration processing of the raw material 1. The defibrating unit 20 performs defibration by the dry method in the atmosphere (in the air). In the example in the drawing, the raw material 1 which is introduced from an introduction port 21 is defibrated by the defibrating unit 20, becomes the defibrated material (fibers), and is discharged from a discharge port 22. The defibrated material which is discharged from the discharge port 22 is supplied to the mixing unit 30 (in the example in the drawing, a tube 86), via a tube 82, a classifying unit 63, and a screening unit 35.

The configuration of the defibrating unit 20 is not particularly limited, and examples of the configuration can include a configuration which has a rotary unit (rotor) and a stationary unit that covers the rotary unit and forms a void (gap) between the rotary unit and the stationary unit. When the defibrating unit 20 is configured in this manner, as the raw material 1 is introduced to the gap in a state where the rotary unit rotates, the defibration processing is performed. In addition, in this case, the number of rotation of the rotary unit, a shape of the rotary unit, a shape of the stationary unit, or the like, can be appropriately designed by requirements for properties of the sheet S to be manufactured or the configuration of the entire apparatus. In addition, in this case, a rotational speed of the rotation unit (number of rotation (rpm) per one minute) can be appropriately set in consideration of conditions, such as throughput of the defibration processing, a retention time of the raw material, an extent of defibration, a size of the gap, or the shape or the size of the rotary unit, the stationary unit, and each of other members.

In addition, it is more preferable that the defibrating unit 20 has a function of generating an air current (airflow) to suck in the raw material 1 (defibration object) and/or discharge the defibrated material. In this case, by the air current which is generated from the defibrating unit 20 itself, the defibrating unit 20 can suck in the raw material 1 together with the air current from the introduction port 21, perform the defibration processing, and transfer the defibrated material to the discharge port 22. In the example illustrated in FIG. 1, the defibrated material which is discharged from the discharge port 22 is carried to the tube 82. In addition, when the defibrating unit 20 which does not include an air current generating mechanism is used, providing an external mechanism which generates an air current that introduces the raw material 1 into the introduction port 21 or an air current which sucks the defibrated material from the discharge port 22, is not a problem.

1.1.1. Raw Material

In the specification, the raw material 1 indicates matter including raw materials of the sheet manufacturing apparatus 120, and examples thereof include material which is intertwined or bonded with the fibers, such as pulp sheets, paper sheets, waste paper sheets, tissue paper sheets, kitchen paper sheets, cleaning agents, filters, liquid absorbents, sound-absorbing materials, cushioning materials, matting materials, or corrugated cardboard. In addition, the raw material 1 may include fibers (organic fibers, inorganic fibers, and organic-inorganic composite fibers) or the like which are constituted of rayon, lyocell, cupra, vinylon, acryl, nylon, aramid, polyester, polyethylene, polypropylene, polyurethane, polyimide, carbon, glass, or metal. In addition, in the sheet manufacturing apparatus 120 of the embodiment, it is possible to use a material which has been recycled one or more times as the raw material 1, and particularly, to effectively use waste paper sheets.

The raw material 1 has a history. The history of the raw material 1 is information which is related to characteristics of the raw material 1, and specific examples thereof include a content of the additive agent in the raw material 1, a type of the additive agent in the raw material 1, a length of the fibers in the raw material 1, or a material of the fibers in the raw material 1. Examples of information for simply obtaining the information which is related to such characteristics of the raw material 1, include information which corresponds to the number of times the raw material 1 has been recycled into sheets S in the past (hereinafter, simply referred to as a "number of recycling"), information which corresponds to the type (paper sheet, absorbent, or the like) of the sheet S, and information which is related to the sheet manufacturing apparatus which has been used in recycling. These pieces of information are ascertained by a marking given to the sheet S. The sheet manufacturing apparatus 120 includes a marking unit 100 which gives the marking to the sheet S, in the sheet forming unit 40 or on a further downstream side from the sheet forming unit 40. In addition, the sheet manufacturing apparatus 120 includes an obtaining unit 8 which obtains the history of the raw material 1 by reading the marking which is given to the raw material 1. The marking unit 100 and the obtaining unit 8 will be described later.

The number of recycling is the number of times the raw material 1 has been recycled into sheets S in the sheet manufacturing apparatus 120. Hereinafter, there will also be a case where the number of recycling is simply referred to as a "number of recycles". Since the paper sheet which is manufactured by the wet type method has not been recycled by the sheet manufacturing apparatus 120, the number of recycles is 0. When the sheet S is manufactured in the sheet manufacturing apparatus 120 by using the paper sheet which has been manufactured by the wet type method as the raw material 1, the number of recycles is 1. In addition, when the sheet S is manufactured in the sheet manufacturing apparatus 120 by using the sheet S in which the number of recycles is 1 as the raw material 1, the number of recycles becomes 2. Even in a case of a sheet which is not manufactured by the sheet manufacturing apparatus 120, if the sheet manufacturing apparatus 120 can ascertain the number of recycles, the ascertained number is added to the number of recycles. Whether or not the sheet manufacturing apparatus 120 can ascertain the number of recycles depends on whether or not the obtaining unit 8 can obtain the history of the raw material. For example, even when the paper sheet which is manufactured by the wet method by recycling the waste paper sheet as the raw material is the raw material 1, if there is no marking or if the sheet manufacturing apparatus 120 cannot ascertain the number, the characteristics of the raw material 1 cannot be ascertained. Therefore, the number of recycles cannot be considered as 1. In this case, the number of recycles is ascertained as 0, and the ascertained number of recycles is included in the information which corresponds to the number of recycles. In addition, the number of recycling of the raw material 1 which is not recycled yet by the sheet manufacturing apparatus 120 is 0. As an amount of the additive agent varies according to the information which corresponds to the number of recycling, even when the amount of the additive agent included in the raw material 1 changes according to the number of recycling, it is possible to set (change) the amount of the additive agent of the sheet S to a desired amount.

The marking which is given to the sheet S may be not only a character which shows the type or the like of the sheet S, the number of recycles or type, but also a mark which is a sign or a symbol in other shapes as long as the sign can make it possible to understand the number of recycles or the type. For example, if the marking is "A", the amount of the additive agent may be decreased. In addition, the information which corresponds to the number of recycling may be not only the number of recycles, but also information which shows whether or not recycling is performed, and whether the number of recycling is 0 or 1 or more.

The sheet manufacturing apparatus 120 varies the amount of the additive agent which is fed by the addition unit 32 with respect to the raw material 1, according to the history of the raw material 1. For example, when the raw material 1 has been recycled twice, the amount of the additive agent which remains in the defibrated material tends to vary every time recycling is performed. However, by varying the amount of the additive agent according to the history of the raw material 1, it is possible for the additive agent in the manufactured sheet S to be set to be of a desired amount.

In addition, when the sheet S is manufactured by using the raw material 1 which has the same history, it is possible to set the feed amount of the additive agent to be the same. The "same history" may have a scope within a range in which the feed amount of the additive agent can be set to be the same in accordance with required performance of the sheet S.

1.1.2. Defibrated Material

In the sheet manufacturing apparatus 120 of the embodiment, the defibrated material which is used as a part of the material of the sheet S to be manufactured, is not particularly limited, and a wide range of the defibrated material can be used as long as the sheet S can be formed. The defibrated material includes the fiber which is obtained by performing the defibration processing of the above-described raw material, and examples of the fiber include natural fibers (animal fibers and vegetable fibers), or chemical fibers (organic fibers, inorganic fibers, and organic-inorganic composite fibers). More specifically, examples of the fibers included in the defibrated material include cellulose fibers which are made of cotton, hemp, kenaf, flax, ramie, jute, Manila hemp, sisal hemp, conifer, or broadleaf tree, silk, or the animal fibers which are made of wool. These examples may be used independently, may be used by being appropriately mixed, or may be used as regenerated fibers in which purification or the like is performed. The defibrated material becomes the material of the sheet S to be manufactured, but may include at least one type of these fibers. In addition, the defibrated material (fibers) may be dried, or may contain or impregnate the liquid, such as water or an organic solvent. Furthermore, in the defibrated material (fibers), various types of surface treatments may be performed.

The defibrated material has various characteristics in accordance with the history of the raw material 1. Examples of the characteristics of the defibrated material are as follows: (1) in a case of a paper sheet in which the raw material 1 is not recycled yet, a resin is not included in the defibrated material as the additive agent; (2) in a case of the sheet S in which the raw material 1 is recycled one or more times, the resin is adhered to the defibrated material as the additive agent; and (3) in a case of the sheet S in which the raw material 1 is recycled two or more times, the fibers included in the defibrated material which are shorter than a paper sheet which is not used are included.

In the defibrated material which is used in the embodiment, more additive agents are adhered to the defibrated material in a case of a greater number of recycling of the raw material 1 compared to a case of a fewer number of recycling. In addition, when the number of recycling is high in this manner, the number of short fibers of the defibrated material increases.

When the fiber included in the defibrated material which is used in the embodiment is one independent fiber, an average diameter (the longest length in a direction which is perpendicular to a longitudinal direction when a cross section is not a circle, or a diameter of the circle (equivalent circle diameter) when the circle is assumed to be a circle which has an area equivalent to an area of the cross section) thereof is 1 μm to 1000 μm, is preferably 2 μm to 500 μm, and is more preferably 3 μm to 200 μm.

The length of the fiber included in the defibrated material which is used in the embodiment is not particularly limited, but as one independent fiber, the length (length of the disentangled defibrated material (fibers) in the longitudinal direction, hereinafter, referred to as a "fiber length") of the fiber along the longitudinal direction is, for example, 1 μm to 10 mm, is preferably 1 μm to 5 mm, and is more preferably 3 μm to 2 mm. When the length of the fiber is short, there is a case where the strength of the sheet S is not sufficient, but if the length is within the above-described range, it is possible to obtain the sheet S having sufficient strength. The length of the fiber along the longitudinal direction may a distance (length of the fiber) between both ends of the fiber when both ends of the one independent fiber is pulled out not to be ruptured as necessary and the fiber is placed in a substantially linear shape as the fiber is in a pulled-out state. In addition, the average length of the fiber as a length-weighted mean fiber length is 20 μm to 3600 μm, is preferably 200 μm to 2700 μm, and is more preferably 300 μm to 2300 μm. Furthermore, the length of the fiber may have unevenness (distribution).

In the specification, when the fiber is referred, there is a case where one fiber is indicated, and there is a case where a coagulation of a plurality of fibers (for example, a state of being in a cotton shape) is indicated. In addition, when the defibrated material is referred, the material which is included in the plurality of fibers is indicated, and a meaning of the coagulation of the fibers and a meaning of a material (material in a powder-like shape or a cotton shape) which becomes the material of the sheet S are included.

1.2. Mixing Unit

Since the addition unit 32 which is provided in the sheet manufacturing apparatus 120 of the embodiment is provided in the mixing unit 30, first, the mixing unit 30 will be described. In addition, the addition unit 32 may be independent from the mixing unit 30, and may be disposed upstream of the mixing unit 30. The mixing unit 30 has a function of mixing the defibrated material and the additive agent in the atmosphere.

In the specification, an expression "mixing the defibrated material and the additive agent" means disposing the additive agent between the fibers which are included in the defibrated material, in a space (system) having a constant capacity.

If it is possible to mix the defibrated material (fibers) and the additive agent, the configuration, the structure, and the mechanism of the mixing unit 30 is not particularly limited. In addition, even when a mode of processing of mixing in the mixing unit 30 is batch processing, any of consecutive processing and sequential processing may be employed. In addition, the mixing unit 30 may be manually or automatically operated. Furthermore, the mixing unit 30 mixes at least the defibrated material and the additive agent, but may be in a mode in which other components can be mixed.

The mixing unit 30 is provided on a further downstream side than the above-described defibrating unit 20. In addition, the mixing unit 30 is provided on a further upstream side than the sheet forming unit 40 which will be described later.

Between the defibrating unit 20 and the mixing unit 30, a configuration of the classifying unit 63 or the screening unit 35 may be included.

Examples of the processing of mixing in the mixing unit 30 can include mechanical mixing and hydrodynamic mixing. Examples of the mechanical mixing include a method of introducing the fibers and the additive agent to a Henschel mixer or the like and stirring the fibers (defibrated material) and the additive agent, and a method of enclosing the fibers (defibrated material) and the additive agent in a bag and shaking the bag. In addition, as the processing of hydrodynamic mixing, it is possible to use a method of introducing the fibers (defibrated material) and the additive agent into the air current of the atmosphere or the like and diffusing both the fibers and the additive agent in the air current. In the method of introducing the fibers (defibrated material) and the additive agent in the air current of the atmosphere or the like, the additive agent may be fed into a tube or the like through which the fibers of the defibrated material flow (are carried) by the air current, or the fibers (defibrated material) may be fed into a tube or the like through which grains of the additive agent flow (are carried) by the air current. In addition, in the method, a case where the air current in the tube or the like is a turbulent flow is more preferable since the efficiency of mixing increases.

As illustrated in FIG. 1, in the mixing unit 30, when the tube 86 for carrying the defibrated material is employed, it is possible to employ the method of introducing the additive agent by the addition unit 32 in a state where the defibrated material flows by the air current in the atmosphere or the like. An example of a section of generating the air current when the tube 86 is employed in the mixing unit 30, include a blower which is not illustrated, and it is possible to use an appropriate means (device) of generating the air current if the above-described functions can be obtained.

In the sheet manufacturing apparatus 120 of the embodiment, the mixing unit 30 uses the dry method. Here, the "dry method" in mixing means a state where mixing is performed in the atmosphere (in the air), not in the liquid. In the mixing unit 30, when the liquid is intentionally added to the extent not to interfere with the mixing operation, in the following processing, it is preferable to add the liquid to the extent that the energy or time for removing the liquid by heating or the like does not become excessive.

The performance of processing of the mixing unit 30 is not particularly limited if it is possible to mix the defibrated material and the additive agent, and the mixing unit 30 can be appropriately designed and adjusted in accordance with the manufacturing performance (throughput) of the sheet manufacturing apparatus 120. The adjustment of the performance of processing of the mixing unit 30 can be performed by changing a size or a charging amount of a processing container if the mixing unit 30 is in the batch processing. In addition, when the above-described tube 86 and the addition unit 32 are employed as the mixing unit 30, it is possible to perform the adjustment of the mixing unit 30 by changing the flow of gas for carrying the defibrated material and the additive agent in the tube 86, an introduce amount of the material, or a carry amount of the material. In addition, when the tube 86 and the addition unit 32 are employed as illustrated in the drawing as the mixing unit 30, it is possible to sufficiently mix the defibrated material and the additive agent.

1.2.1 Addition Unit

The mixing unit 30 includes the addition unit 32 which adds the additive agent to the defibrated material which is defibrated in the defibrating unit 20. The addition unit 32 feeds the additive agent so that the amount thereof with respect to the raw material 1 varies according to the history of the raw material 1 which is supplied to the defibrating unit 20. The addition unit 32 may be configured to have a feeder which introduces the additive agent to a circulation path of the defibrated material.

It is possible to introduce the additive agent (including a case where the additive agent is a complex body) in a case where the tube 86 is employed in the mixing unit 30 by an opening/closing operation of a valve or by hands of those skilled in the art. However, it is also possible to introduce the additive agent by using a screw feeder which functions as the addition unit 32 as illustrated in FIG. 1 or a disc feeder which is not illustrated. Using these feeders is more preferable because it is possible to reduce the change in the add amount of the additive agent in the flow direction of the air current. In addition, this is also similarly preferable when the additive agent is carried by the air current and the defibrated material is introduced into the air current. In the example in the drawing, the additive agent is supplied to the tube 86 through a supply port 31 which is provided in the tube 86 from the addition unit 32. Therefore, in the example in the drawing, the mixing unit 30 is configured of a part of the tube 86, the addition unit 32, and the supply port 31.

Here, a component other than the additive agent which can be supplied from the addition unit 32 may be a material which can give the performance that is required in the sheet S to the defibrated material. Examples of the component other than the additive agent includes the fiber, a coagulation inhibitor, a coloring material, a flame retardant, an organic solvent, surfactant, an antifungal and antiseptic agent, antioxidant, ultraviolet absorber, or oxygen absorber.

By using the plurality of screw feeders, in accordance with the history of the raw material 1, it is possible to supply the additive agent to the mixing unit 30 so that the add amount of the additive agent and other components varies. In addition, in addition to the history of the raw material 1, in order to satisfy the required performance of the sheet S, the add amount of the additive agent and other components may be changed.

Figure 2:
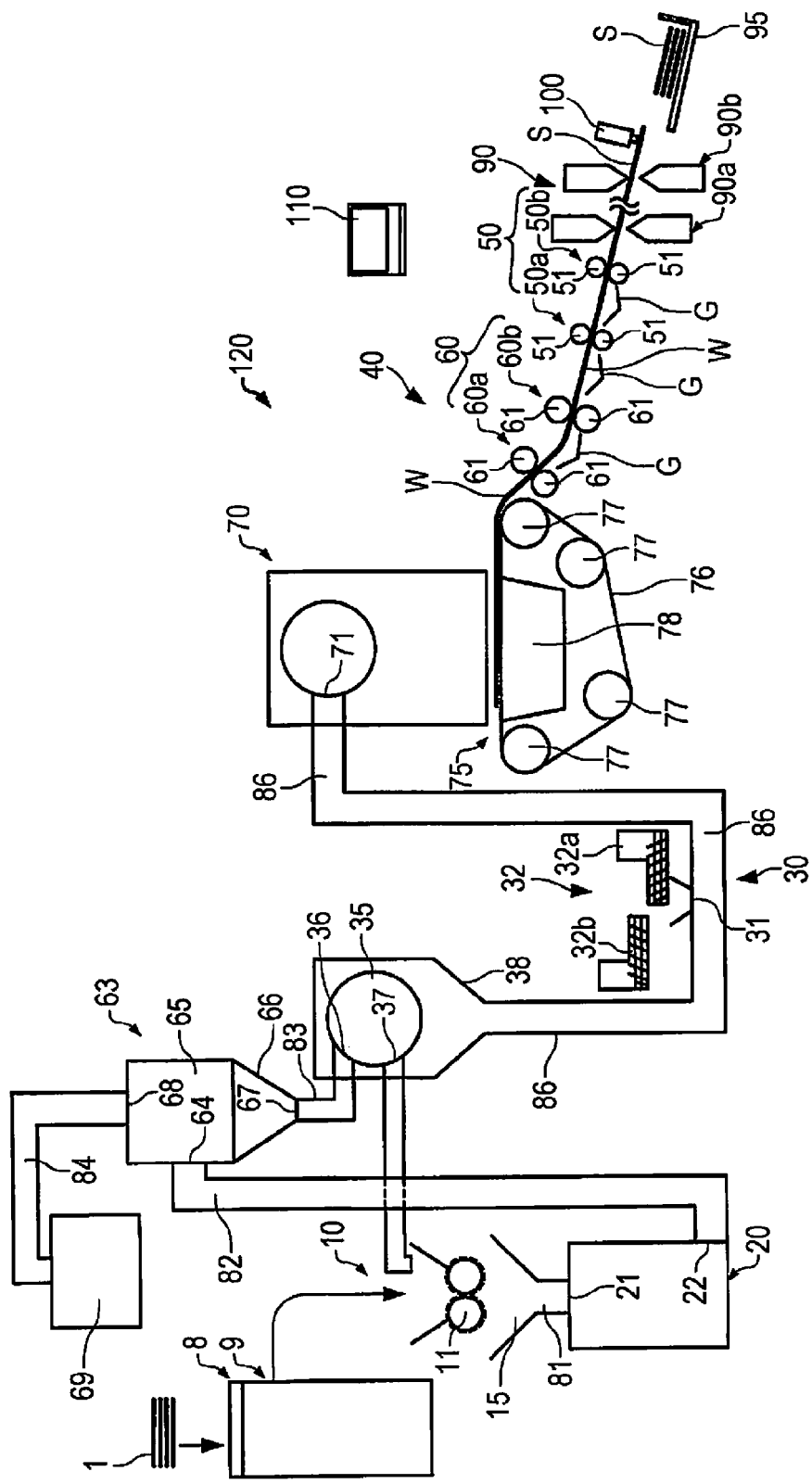
FIG. 2 is a schematic view illustrating the sheet manufacturing apparatus according to the embodiment in which a modification example of a mixing unit is employed.

FIG. 2 illustrates a state where the addition unit 32 uses the plurality of screw feeders. FIG. 2 is a schematic view illustrating the sheet manufacturing apparatus 120 according to the embodiment in which a modification example of the mixing unit 30 is employed. When the plural types of additive agents are separately supplied, or when the additive agent and the components other than the additive agent are separately supplied, in this manner, the plurality of screw feeders may be provided. This embodiment shown in FIG. 2 will be described in a section "1.2.1.2. Fiber", but the addition unit 32 may include a resin feeding unit 32a which feeds, for example, the resin which is the additive agent, and a fiber feeding unit 32b which feeds, for example, the fibers which is other components.

1.2.1.1. Additive Agent or the Like

The additive agent which is supplied from the addition unit 32 bonds the plurality of fibers which are included in the defibrated material to each other. As the additive agent, it is possible to use the resin, starch (in particular, in a case of a wet method), and a water-soluble bonding material. In addition, the additive agent may contain components other than the bonding components.

The additive agent can be supplied by a suitable amount with respect to the defibrated material from the addition unit 32. The amount of the additive agent which is fed by the addition unit 32 with respect to the raw material 1 varies according to the history of the raw material 1. For example, when the sheet S has been recycled twice, the amount of the additive agent included in the defibrated material varies every time recycling is performed. However, as the amount of the additive agent varies according to the history of the raw material 1, it is possible to set the additive agent in the manufactured sheet S to a desired amount.

Influence of the history of the raw material 1 remains on the defibrated material which is carried to the mixing unit 30. For example, when the sheet S which is already recycled is used as the raw material 1, more additive agents are adhered to the defibrated material than the defibrated material which is not recycled. Here, in a case where the sheet S which has been recycled a greater number of times is used as the raw material 1, compared to a case where the sheet S which has been recycled a fewer number of times is used as the raw material 1, it is possible to reduce the amount of the additive agent to be fed. According to this, even when the sheet S which has been recycled a greater number of times is used as the raw material 1, there being an excessive amount of additive agent in the sheet is prevented.

In general, general paper sheets are mainly made of hydrogen bonding which is considered as a main body by the wet method, and the amount of the additive agent which bonds the fibers to each other is small. When such paper sheets are used as the raw material 1, it is possible to make the sheet S having high strength or excellent water resistance by making the sheet S by the dry method by adding the additive agent which bonds the fiber to the raw material 1. When the sheet is manufactured by the dry method, since the hydrogen bonding is not used or is small, the add amount of the additive agent is greater than in the wet method. Meanwhile, when the sheet S is used as the raw material 1, since the additive agent is already included in the sheet S, the amount of the additive agent becomes excessive when the same amount of the additive agent as the amount of the additive agent which is added in the paper sheet made by the wet method is added. When recycling is performed by using the sheet S which is made by adding the additive agent once as the raw material 1, the amount of the additive agent is further increased. A case where the amount of the additive agent is excessive means a case where it is not possible to regenerate the same sheet S as the sheet S before regeneration. Here, by varying the amount of the additive agent to be fed according to the history of the raw material 1, for example, the number of recycling, there being an excessive amount of additive agent in the sheet is prevented. Specifically, in a case where the sheet S which is manufactured by the sheet manufacturing apparatus 120 is used as the raw material 1, that is, a case where the number of recycles is 1, the amount of the additive agent included in the raw material is greater than that in a case where the paper sheet which is manufactured by the wet method is used as the raw material 1, that is, a case the number of recycles is 0. For this reason, the amount of the additive agent to be fed is decreased.

In addition, for example, if it is possible to provide the classifying unit 63 which will be described later on the upstream side of the mixing unit 30, and to completely remove the additive agent from the defibrated material in the classifying unit 63, it is possible to set the feed amount of the additive agent to be constant. However, it is not possible to completely remove the additive agent from the defibrated material in the classifying unit 63. For this reason, even when the classifying unit 63 is provided, it is not possible to supply the same amount of additive agent every time recycling is performed in the addition unit 32.

In addition, since the sheet S is already recycled, only by evenly reducing the amount of the additive agent, a case where the amount of the additive agent is decreased in the sheet S which has been recycled plural times is also considered. For this reason, the add amount of the additive agent may also be changed in accordance with the number of recycling.

1.2.1.1.1. Resin

The additive agent which bonds the fibers to each other may include the resin. As a type of the resin, any of a natural resin and a synthesized resin may be employed. In the sheet manufacturing apparatus 120 of the embodiment, it is preferable that the resin is a solid at a room temperature, it is preferable that the resin is the synthesized resin in which a melting point or the like is adjusted to be within a predetermined range for obtaining stabilized performance of the sheet S to be manufactured, and it is more preferable that the resin is a thermoplastic resin when the resin is used in bonding the fibers by heating in a heating unit 50.

The resin includes the resin for bonding the plurality of fibers. At the point of time when the additive agent is supplied to the tube 86, the plurality of fibers included in the defibrated material are not bonded to each other intentionally except a case where defibration is not sufficiently performed. The resin which is included in the additive agent is melted or softened when passing through the heating unit 50 which will be described later, and after this, the plurality of fibers are bonded to each other by hardening.

In addition, when the raw material 1 is recycled sheet S, the resin for bonding the plurality of fibers remains in the defibrated material, and a part thereof is adhered to the fibers. In this case, it is possible to add the resin by an appropriate amount from the addition unit 32 in addition to the resin which is adhered to the fibers so that the sheet S in which the resin in the sheet S has a desired amount can be manufactured.

Therefore, the amount of the resin in the sheet S is appropriately set in accordance with the history of the raw material 1 and the type of the sheet S to be manufactured. The proportion of the resin in the sheet S is, for example, 5% by weight to 70% by weight. From the viewpoint of obtaining an excellent mixture in the mixing unit 30 and making it difficult to receive the additive agent descending due to gravity when the mixture is molded in a web shape, the proportion is preferably 5% by weight to 50% by weight. In the example in the drawing, the supplied additive agent is mixed with the defibrated material in the tube 86 which configures the mixing unit 30.

Examples of the natural resin include rosin, dammar, mastic, copal, amber, shellac, Daemonorops draco, Sandarac, or colophonium. These examples may be used independently or by being appropriately mixed. In addition, these examples may be appropriately chemically denatured.

In addition, examples of the thermoplastic resin among the synthesized resins include an AS resin, an ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, or polyether ether ketone.

These resins may be used independently or by being appropriately mixed. In addition, the resins may be copolymerized or denatured, and examples of this type of resin include a styrene resin, an acrylic resin, a styrene-acrylic copolymer resin, an olefin resin, a vinyl chloride resin, a polyester resin, a polyamide resin, a polyurethane resin, a polyvinyl alcohol resin, a vinyl ether resin, an N-vinyl resin, or a styrene-butadiene resin.

The additive agent may have a fibrous form, and may have a powder-like shape. When the additive agent has a fibrous form, the fiber length of the additive agent is preferably equal to or less than the fiber length of the defibrated material. Specifically, the fiber length of the additive agent is equal to or less than 3 mm, and is more preferably equal to or less than 2 mm. When the fiber length of the additive agent is longer than 3 mm, there is a case where it is difficult to mix the defibrated material with excellent uniformity. When the additive agent has a powder-like shape, a grain size (diameter) of the additive agent is 1 µm to 50 µm, and is more preferably 2 µm to 20 µm. When the grain size of the additive agent is less than 1 µm, there is a case where a bonding force which bonds the fibers to each other in the defibrated material deteriorates. When the grain size of the additive agent is greater than 20 µm, there is a case where it is difficult to mix the defibrated material with excellent uniformity, and there is a case where unevenness is generated in the sheet S to be manufactured as an adhering force to the defibrated material deteriorates and the additive agent is separated from the defibrated material.

By using the resin as the additive agent, it is possible to manufacture the sheet S having excellent water resistance and strength.

1.2.1.1.2. Coagulation Inhibitor

In addition to the resin which bonds the defibrated material, the additive agent may include the coagulation inhibitor for suppressing coagulation between the fibers in the defibrated material or between the resins in the additive agent. In addition, when the coagulation inhibitor is included in the additive agent, it is preferable to integrate the resin and the coagulation inhibitor. In other words, when the coagulation inhibitor is included in the additive agent, it is preferable that the additive agent is a complex body which has the resin and the coagulation inhibitor integrated therein.

Specific examples of materials of the coagulation inhibitor include silica, titanium oxide, aluminum oxide, zinc oxide, cerium oxide, magnesium oxide, zirconium oxide, strontium titanate, barium titanate, or calcium carbonate. In addition, a part (for example, titanium oxide or the like) of the exemplified materials of the coagulation inhibitor is the same as the material of the coloring material, but is different in that the grain size of the coagulation inhibitor is smaller than the grain size of the coloring material. For this reason, the coagulation inhibitor does not greatly influence a color tone of the sheet S to be manufactured, and can be distinguished from the coloring material. However, when the color tone of the sheet S is adjusted, even when the grain size of the coagulation inhibitor is small, since there is a case where some effects, such as light scattering, are generated, it is preferable to consider such effects.

1.2.1.1.3. Coloring Material

In addition to the resin which bonds the fibers of the defibrated material, the additive agent may include the coloring material. In addition, when the coloring material is included in the additive agent, it is preferable to integrate the resin and the coloring material. In other words, it is preferable that the additive agent is a complex body in which the resin and the coloring material are integrated. In addition, even when the complex body includes the above-described coagulation inhibitor, the complex body can have the resin, the coloring material, and the coagulation inhibitor integrated. In other words, the additive agent may include the complex body in which the resin, the coagulation inhibitor, and the coloring material are integrated.

The color and the type of pigments are not particularly limited, and it is possible to use pigments having various colors (white, blue, red, yellow, cyan, magenta, yellow, black, or special colors (pearl or metallic luster)) which are generally used in ink. The pigments may be inorganic pigments, and may be organic pigments. As the pigments, it is possible to use known pigments described in JP-A-2012-87309, or in JP-A-2004-250559. In addition, white pigments, such as zinc white, titanium oxide, antimony white, zinc sulfide, clay, silica, white carbon, talc, or alumina white, may be used. These pigments may be used independently, and may be used by being appropriately mixed. In addition, when the white pigments are used, among the above-described examples, it is more preferable to use the pigments which are made of powder including grains (pigment grains) which has titanium oxide as a main component since it is easy to enhance the whiteness of the sheet S to be manufactured with a small compound amount, by a high refractive index of titanium oxide.

1.2.1.1.4. Water-Soluble Bonding Agent

In a case of the wet method, it is possible to use water-soluble bonding agent as the additive agent. Examples of the water-soluble bonding agent include polyacrylamide, polyamide-epichlorohydrin resin, polyvinyl alcohol, starch, or alkyl ketene dimer. In addition, the water-soluble bonding agent is called a paper strengthening agent.

1.2.1.2. Fiber

The components other than the additive agent which are supplied from the addition unit 32 may include the fiber. As a type of the fiber, the fiber which is necessary for obtaining a desired sheet S may be appropriately selected among the fibers described above in "1.1.1. Raw Material". It is preferable that the fiber is a fiber which is the same type as the fiber included in the raw material 1. This is because it is possible to manufacture the sheet S having the same function as that of the raw material 1. In addition, the fiber may be a fiber which can reinforce the sheet S. For example, a fiber which has higher strength than that of the fiber included in the raw material 1 may be employed, or a longer fiber may be employed. Otherwise, the fiber which can be obtained by defibrating the raw material 1 in which the number of recycles is 0 may be employed. By selecting such fibers, it is possible to reinforce strength of the sheet S.

When the fibers are supplied from the addition unit 32, the sheet manufacturing apparatus 120 which employs the modification example of the mixing unit 30 illustrated in FIG. 2 may be employed.

As illustrated in FIG. 2, the addition unit 32 may include the resin feeding unit 32a for supplying the resin and the fiber feeding unit 32b for supplying the fibers, to the defibrated material which is defibrated by the defibrating unit 20. In this case, for example, the resin feeding unit 32a is the addition unit 32 in FIG. 1 and can supply the resin to the defibrated material by a suitable amount, and the fiber feeding unit 32b can supply the fibers to the defibrated material by a suitable amount.

The resin feeding unit 32a and the fiber feeding unit 32b can use the above-described configuration (screw feeder or the like) as the addition unit 32 in FIG. 1.

The feed amount of the fibers in the fiber feeding unit 32*b* can be changed according to the history of the raw material 1. In addition, the feed amount of the fibers in the fiber feeding unit 32*b* may be greater in a case where the sheet S which has been recycled a greater number of times is used as the raw material 1 compared to a case where the sheet S which has been recycled a fewer number of times is used as the raw material 1. For example, when the sheet S in which the number of recycles is 0 or 1 is used as the raw material 1, the fibers are not fed in the fiber feeding unit 32*b*, and when the number of recycles is 2, the fibers are fed in the fiber feeding unit 32*b*. When the number of recycling is high, the proportion of the additive agent increases as described above, and the proportion of the fibers in the defibrated material decreases. For this reason, it is possible to enhance the proportion of the fibers in the defibrated material by feeding the fibers, and to prevent the amount of other additive agents with respect to the fibers from being excessive.

In addition, when the sheet S is recycled plural times, since the proportion of the fibers which become shorter every time the fibers included in the defibrated material are recycled increases, by supplying the fibers which are not recycled or the fibers which has been recycled a fewer number of times according to the history of the raw material 1, and further, by varying the supply amount thereof in accordance with the number of recycling, it is possible to reinforce the sheet S, and to manufacture the sheet S having a desired strength.

The proportion of the fibers or the length of the fibers in the defibrated material can be decided according to the history of the raw material 1.

1.3. Sheet Forming Unit

The sheet forming unit 40 forms the sheet S by bonding the plurality of fibers to each other via the additive agent.

The mixture, which is made by mixing the additive agent into the defibrated material in the mixing unit 30, forms the sheet S by bonding the fibers to each other via the additive agent, in the sheet forming unit 40.

In addition, in the specification, a case where the sheet S is referred is a case where a structure in which the plurality of fibers are bonded to each other via the resin in a two-dimensional or a three-dimensional manner, or the fibers are bonded by the hydrogen bonding.

A shape of the sheet S in the specification is not limited to a sheet shape, and may be a film shape, a board shape, a web shape, or an uneven shape. In addition, the sheet S in the specification can be divided into a paper sheet and a non-woven fabric. Examples of the paper sheet include a state of being formed in a sheet shape by using the pulp or the waste paper sheet as the raw material, and include a recording paper sheet for writing or printing, a wall paper sheet, a wrapping paper sheet, a color paper sheet, a drawing paper sheet, and a Kent paper sheet. The non-woven fabric is thicker in thickness and weaker in strength than the paper sheet, and includes general non-woven fabrics, fiber boards, tissue paper sheets, kitchen paper sheets, cleaning agents, filters, liquid absorbents, sound-absorbing materials, cushioning materials, or matting materials.

The sheet S may have the same function as that of the sheet S which is used in the raw material 1. When a copy paper sheet for business is used as the raw material 1, the sheet S may be the copy paper sheet for business. In this manner, it is possible to regenerate the copy paper sheet for business into a copy paper sheet for business which has the same function even when recycling is performed plural times.

Examples of the sheet forming unit 40 can include a deposition unit 75, a pressing unit 60, a heating unit 50, and a cutting unit 90. These will be described later.

1.4. Operation Effect

According to the sheet manufacturing apparatus 120 of the embodiment, by varying the amount of the additive agent according to the history of the raw material 1, it is possible for the additive agent in the sheet S to be set to be of a desired amount. For example, when the sheet S has been recycled twice, the amount of the additive agent included in the defibrated material varies every time recycling is performed, but by doing so, it is possible for the additive agent in the sheet S to be set to be of a desired amount.

1.5. Other Configurations

Figure 3:
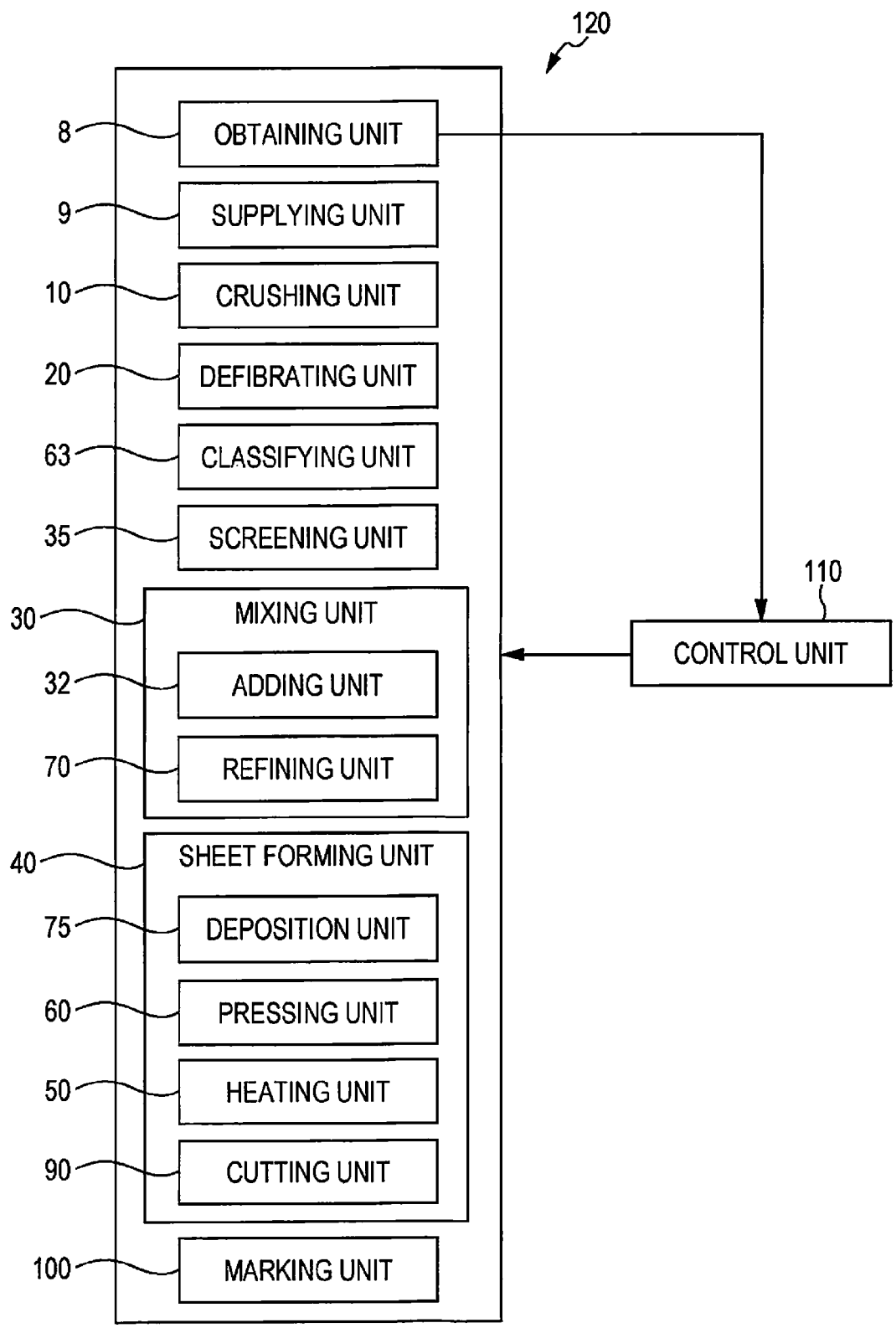
FIG. 3 is a functional block diagram illustrating the sheet manufacturing apparatus according to the embodiment.

With reference to FIGS. 1 to 3, other configurations of the sheet manufacturing apparatus 120 will be described. FIG. 3 is a functional block diagram illustrating the sheet manufacturing apparatus 120 according to the embodiment.

The sheet manufacturing apparatus 120 of the embodiment can include various configurations, such as, the obtaining unit 8, a supplying unit 9, a crushing unit 10, the classifying unit 63, the screening unit 35, the marking unit 100, and a control unit 110, in addition to the defibrating unit 20, the mixing unit 30, and the sheet forming unit 40 which are described above. In addition, in addition to the above-described addition unit 32, the mixing unit 30 can include a refining unit 70. Furthermore, the sheet forming unit 40 can include various configurations, such as, the deposition unit 75, the pressing unit 60, the heating unit 50, and the cutting unit 90. Each of these configurations will be described below. In addition, a plurality of obtaining units 8, supplying units 9, crushing units 10, defibrating units 20, classifying units 63, screening units 35, mixing units 30, refining units 70, sheet forming units 40, deposition units 75, pressing units 60, heating units 50, cutting units 90, and marking units 100, may be provided as necessary.

1.5.1. Obtaining Unit

The sheet manufacturing apparatus 120 of the embodiment may include the obtaining unit 8. The obtaining unit 8 obtains the history of the raw material 1. The obtaining unit 8 obtains various types of history which can be read from the raw material 1. The history is various pieces of information which is described in "1.1.1. Raw Material", but the obtaining unit 8 includes a section of reading these various pieces of information. For example, the obtaining unit 8 may obtain the history of the raw material 1 by reading the marking which is given to the sheet S in the marking unit 100 which will be described later. The obtaining unit 8 is, for example, an optical sensor, and reads the marking by emitting light with respect to the marking and receiving reflected light.

In the sheet manufacturing apparatus 120 illustrated in FIG. 1, the obtaining unit 8 is disposed at a position which is the upstream side of the defibrating unit 20, and at which the raw material 1 is supplied to the sheet manufacturing apparatus 120. The history of the raw material 1 obtained by the obtaining unit 8 is output to the control unit 110.

1.5.2. Supplying Unit

The sheet manufacturing apparatus 120 of the embodiment may include the supplying unit 9. In the sheet manufacturing apparatus 120 illustrated in FIG. 1, the supplying unit 9 is positioned on the upstream side of the defibrating unit 20, and supplies the raw material 1 to the downstream side. The supplying unit 9 may supply the raw material 1 to the crushing unit 10.

The supplying unit 9 is an automatic feeding device for sequentially feeding the raw material 1 into the crushing unit 10.

Based on the history of the raw material 1 obtained by the obtaining unit 8, the supplying unit 9 may screen various types of the raw materials 1 having the same level of history, store the raw material 1 by the type, and supply the raw material 1 by the type to the crushing unit 10, according to a command of the control unit 110. When the plurality of raw materials 1 is sequentially supplied from the supplying unit 9, by sequentially supplying the raw material 1 having the same level of history downstream, it is possible to supply the same amount of the additive agent, and to sequentially manufacture the sheets S having the same level of performance. In addition, when the raw materials 1 are supplied from the supplying unit 9 one by one, it is possible to vary the amount of the additive agent every raw material 1, and to manufacture the sheet S having a desired amount of the additive agent.

1.5.3. Crushing Unit

The sheet manufacturing apparatus 120 of the embodiment may include the crushing unit 10. In the sheet manufacturing apparatus 120 illustrated in FIG. 1, the crushing unit 10 is disposed on the upstream side of the defibrating unit 20. The crushing unit 10 cuts out the raw material 1, such as the pulp sheet or the fed sheet (for example, the waste paper sheet having an A4 size) in the air, and makes the raw material 1 a defibration object. The shape or the size of the defibration object is not particularly limited, but for example, the raw material 1 may be cut out to several centimeters square. In the example in the drawing, the crushing unit 10 includes a crushing blade 11, and it is possible to cut out the fed raw material 1 by the crushing blade 11.

A specific example of the crushing unit 10 includes a shredder. In the example in the drawing, the defibration object which is cut out by the crushing unit 10 is transferred to the defibrating unit 20 via a tube 81 after being received by a hopper 15. The tube 81 communicates with the introduction port 21 of the defibrating unit 20.

1.5.4. Classifying Unit

In the sheet manufacturing apparatus 120 illustrated in FIG. 1, the classifying unit 63 is disposed on the upstream side of the mixing unit 30 and a downstream side of the defibrating unit 20. The classifying unit 63 separates the additive agent, the resin grains, and the ink grains, which are included in the raw material 1 and have a relatively small size or a low density, and removes these from the defibrated material. According to this, it is possible to enhance an occupancy ratio of the fibers which have a relatively large size or a high density in the defibrated material.

As the classifying unit 63, it is preferable to use an airflow classifier. The airflow classifier generates a swirling air current and performs separation in accordance with a difference between a centrifugal force and a centrifugal force received according to the size and the density of the classified materials. By adjusting the speed of the air current and the centrifugal force, it is possible to adjust a classification point. Specifically, as the classifying unit 63, a cyclone, an elbow jet, or an Eddy classifier, is used. In particular, since the cyclone has a simple structure, it is possible to appropriately use the cyclone as the classifying unit 63. Hereinafter, a case where the cyclone is used as the classifying unit 63 will be described.

The classifying unit 63 includes an introduction port 64, a cylinder unit 65 to which the introduction port 64 is connected, an inverse cone unit 66 which is positioned below the cylinder unit 65 and continues to the cylinder unit 65, a lower discharge port 67 which is provided in the center of a lower part of the inverse cone unit 66, and an upper discharge port 68 which is provided in the center of an upper part of the cylinder unit 65.

In the classifying unit 63, the air current which has the defibrated material introduced from the introduction port 64 therein changes into a circumferential movement by the cylinder unit 65. Accordingly, the centrifugal force is applied to the introduced defibrated material, and it is possible to separate the fibers having a higher density than that of the resin grains or the ink grains in the defibrated material, or the resin grains or the ink grains having a lower density than that of the fibers in the defibrated material. The component having more fibers are discharged from the lower discharge port 67, and introduced to the screening unit 35 through a tube 83. Meanwhile, the resin grains or the ink grains are discharged to the outside of the classifying unit 63 through a tube 84 from the upper discharge port 68. In the example in the drawing, the tube 84 is connected to a receiving unit 69, and the fine powder is collected to the receiving unit 69.

In addition, it is described that the fibers and fine powder are separated by the classifying unit 63, but a complete separation is not possible. For example, there is a case where the fibers having a relatively small size and a low density among the fibers, are discharged to the outside together with the fine powder. In addition, the fine powder which has a relatively high density or is bonded to the fibers among the fine powder, is introduced to the screening unit 35 together with the fibers.

In addition, since the fine powder, such as the resin grains or the ink grains, is not included when the raw material is not the waste paper sheet, but the pulp sheet, the classifying unit 63 may not be provided in the sheet manufacturing apparatus 120. Inversely, when the raw material is the waste paper sheet, since the color tone of the sheet to be manufactured is excellent, it is preferable that the sheet manufacturing apparatus 120 is configured to include the classifying unit 63. In addition, since there are many cases where the paper sheet acquires more excellent whiteness than that of the non-woven fabric, there is a case where it is better to provide the classifying unit 63 when manufacturing the paper sheet, and not to provide the classifying unit 63 when manufacturing the non-woven fabric.

1.5.5. Screening Unit

The sheet manufacturing apparatus 120 of the embodiment may include the screening unit 35. The screening unit 35 can screen the defibrated material which is defibration-processed in the defibrating unit 20 by the length of the fibers. In addition, in the above-described classifying unit 63, it is described that the fine resin grains or the like are removed, but the screening unit 35 may have such a function. Therefore, the screening unit 35 is provided downstream of the defibrating unit 20, and further upstream of the refining unit 70.

As the screening unit 35, it is possible to use a sieve. Here, the screening unit 35 includes a net (filter, screen), and screens materials having a size that can pass through the net and materials having a size that cannot pass through the net. The screening unit 35 includes an introduction port 36 and a discharge port 37. The screening unit 35 can be configured similarly to the refining unit 70 which will be described later. However, unlike the refining unit 70, the screening unit 35 does not allow all of the introduced materials to pass through, and has a function of removing some components. An example of the screening unit 35 includes a cylindrical sieve which can rotate by a motor. The net of the screening unit 35 can use a mesh, an expand metal which is made by expanding a metal plate having a notch, and a punching metal which has holes formed by a press machine or the like on the metal plate.

By providing the screening unit 35, it is possible to divide the fibers or grains having a smaller size than an aperture of the net, and the fibers, non-defibrated pieces, or a lump which has a greater size than the aperture of the net. The screened material can be used by being selected in accordance with the sheet S to be manufactured. The defibrated material which passes through the sieve of the screening unit 35 is transferred to an introduction port 71 of the refining unit 70 via the tube 86 of the mixing unit 30 after being received by a hopper 38. In addition, the material which is removed by the screening unit 35 may return to the crushing unit 10 from the discharge port 37.

1.5.6. Refining Unit

The sheet manufacturing apparatus 120 may include the refining unit 70. In the sheet manufacturing apparatus 120 illustrated in FIG. 1, the refining unit 70 and the deposition unit 75 are disposed downstream of the addition unit 32. In FIG. 3, the refining unit 70 is included in the mixing unit 30 together with the addition unit 32.

The refining unit 70 introduces the mixture which passes through the tube 86 of the mixing unit 30 from the introduction port 71, and sends down (drop) the mixture while scattering the mixture in the air. In addition, in this example, the sheet manufacturing apparatus 120 includes the deposition unit 75, deposits the mixture which is sent down from the refining unit 70 in the air by the deposition unit 75, and forms a web W shape.

The refining unit 70 refines the intertwined defibrated material (fibers). Furthermore, when the resin of the additive agent supplied from the addition unit 32 has a fibrous form, the refining unit 70 refines the intertwined resin. In addition, the refining unit 70 performs an operation of uniformly depositing the mixture in the deposition unit 75 which will be described later. In other words, the word "refine" includes an operation of making the intertwined material come apart and the operation of uniformly depositing the mixture. In addition, the refining unit 70 achieves an effect of uniformly depositing the material if there is no intertwined materials.

As the refining unit 70, the sieve is used. An example of the refining unit 70 includes a rotary sieve which can rotate by the motor. Here, the "sieve" of the refining unit 70 may not have a function of screening a certain target. In other words, the "sieve" which is used as the refining unit 70 means a sieve which is provided with the net (filter, screen), and the refining unit 70 may drop down all of the defibrated materials and the additive agents which are introduced to the refining unit 70.

1.5.7. Deposition Unit

The sheet manufacturing apparatus 120 may include the deposition unit 75. The defibrated material and the additive agent which pass through the refining unit 70 are deposited in the deposition unit 75. As illustrated in FIG. 1, the deposition unit 75 may include a mesh belt 76, a stretching roller 77, and a suction mechanism 78. The deposition unit 75 may be configured to include a tension roller or the like which is not illustrated.

The deposition unit 75 forms the web W in which the mixture which is sent down from the refining unit 70 is deposited in the air (corresponds to the web forming process when matching the refining unit 70). The deposition unit 75 has a function of depositing the mixture which is uniformly scattered in the air by the refining unit 70, on the mesh belt 76. In addition, a moisture-adjusting unit may be provided on a downstream side of the deposition unit 75 so as to adjust an amount of moisture of the mixture which is sent down from the refining unit 70.

Below the refining unit 70, the endless mesh belt 76 in which the mesh that stretches by the stretching roller 77 (in the embodiment, four stretching rollers 77) is formed is disposed. As at least one of the stretching rollers 77 self-rotates, the mesh belt 76 moves in one direction.

In addition, vertically below the refining unit 70, via the mesh belt 76, the suction mechanism 78 which functions as a sucking unit which generates the air current vertically downward is provided. By the suction mechanism 78, it is possible to suck in the mixture which is scattered in the air by the refining unit 70 onto the mesh belt 76. Accordingly, it is possible to suck in the mixture which is scattered in the air, and to increase a discharge speed from the refining unit 70. As a result, it is possible to enhance productivity of the sheet manufacturing apparatus 120. In addition, by the suction mechanism 78, it is possible to form a downflow in a descending path of the mixture, and to prevent the defibrated material or the additive agent from being intertwined during the descending.

By sending down the mixture from the refining unit 70 while moving the mesh belt 76, it is possible to form the elongated web W in which the mixture is uniformly deposited. Here, an expression "uniformly deposit" means a state where the deposited materials have substantially the same thickness and substantially the same density. However, since all of the deposited materials are not manufactured as the sheet S, the part which becomes the sheet S may be uniform. An expression "ununiformly deposit" means a state where the deposition is not performed uniformly.

If the mesh belt 76 can be made of a metal, a resin, cloth, or a non-woven fabric, the mixture can be deposited, and the mesh belt 76 allows the mixture to pass through the air current, any type of mesh belt may be employed. A hole diameter (diameter) of the mesh belt 76 is, for example, 60 μm to 250 μm. When the hole diameter of the mesh belt 76 is less than 60 μm, there is a case where it is difficult to form the stabilized air current by the suction mechanism 78. When the hole diameter of the mesh belt 76 is greater than 250 μm, there is a case where the fibers of the mixture enter the mesh, and unevenness of the front surface of the sheet S to be manufactured increases. In addition, the suction mechanism 78 can be configured to form an enclosure box in which a window having a desired size is opened below the mesh belt 76, to suck in the air other than from the window, and to make the inside of the box into a negative pressure by the external air.

As described above, by passing the refining unit 70 and the deposition unit 75 (web forming process), the web W in a state of containing a lot of air and being softly swollen is formed. Next, as illustrated in FIG. 1, the web W which is formed on the mesh belt 76 is transferred by the rotational movement of the mesh belt 76. In this example, the web W which is formed on the mesh belt 76 is transferred to the pressing unit 60, the heating unit 50, the cutting unit 90, and the marking unit 100.

1.5.8. Pressing Unit

The sheet manufacturing apparatus 120 of the embodiment may include the pressing unit 60. In the sheet manufacturing apparatus 120 illustrated in FIG. 1, the pressing unit 60 is disposed on the downstream side of the mixing unit 30 and the upstream side of the heating unit 50. The pressing unit 60 passes the refining unit 70 and the deposition unit 75, is formed in a sheet shape, and performs pressing without heating the web W. Therefore, the pressing unit 60 may not include a heating section, such as a heater. In other words, the pressing unit 60 is configured to perform so-called calendering processing.

In the pressing unit 60, by pressing (compressing) the web W, an interval (distance) between the fibers in the web W contracts, and the density of the web W increases. As illustrated in FIG. 1, the pressing unit 60 is configured to nip the web W by the rollers, and to press the web W, and includes a pair of pressing rollers 61. Each of center axes of the pair of pressing rollers 61 is parallel to each other. In addition, the pressing unit 60 of the sheet manufacturing apparatus 120 of the embodiment is provided with a first pressing unit 60a which is disposed on the upstream side in a transfer direction of the web W, and a second pressing unit 60b which is disposed on the downstream side of the first pressing unit 60a, and each of the first pressing unit 60a and the second pressing unit 60b is provided with a pair of pressing rollers 61. In addition, between the first pressing unit 60a and the second pressing unit 60b, a guide G which assists the transfer of the web W is disposed.

In the pressing unit 60, since only pressing is performed without heating, the resin in the additive agent does not melt. In addition, in the pressing unit 60, only pressing is performed without heating, even when the moisture-adjusting unit is provided on the upstream side, here, the moisture in the mixture is mostly not removed.

In the sheet manufacturing apparatus 120 of the embodiment, the pressing unit 60 (first pressing unit 60a and second pressing unit 60b) and the heating unit 50 (first heating unit 50a and second heating unit 50b) are provided. In addition, in the example, the heating unit 50 performs pressing with respect to the web W, but it is preferable that a pressing force of the pressing unit 60 is set to be greater than a pressing force by the heating unit 50. For example, it is preferable that the pressing force of the pressing unit 60 is set to be 500 kgf to 3000 kgf, and the pressing force of the heating unit 50 is set to be 30 kgf to 200 kgf. In this manner, by setting the pressing force of the pressing unit 60 to be greater than that by the heating unit 50, it is possible to sufficiently shorten the distance between the fibers included in the web W by the pressing unit 60, and by heating and pressing in this state, it is possible to form a thinner sheet which has a high density and high strength.

In addition, in the sheet manufacturing apparatus 120 of the embodiment, as illustrated in FIG. 1, the diameter of the pressing roller 61 is set to be greater than the diameter of a heating roller 51. Since the diameter of the pressing roller 61 is greater than the diameter of the heating roller 51, it is possible to bite the web W in a state of not being compressed yet, and to efficiently transfer the web W. Meanwhile, since the web W which passes through the pressing roller 61 is in a compressed state, and is likely to be transferred, the diameter of the heating roller 51 which is disposed on the downstream side may be smaller than that of the pressing roller 61. In addition, the diameter of the heating roller 51 and the diameter of the pressing roller 61 are appropriately set in accordance with the thickness or characteristics of the web W to be manufactured.

In addition, the pressing unit 60 which is illustrated in the drawing is an example of a case where two pairs of pressing rollers 61 are provided. However, when the pressing unit 60 is employed and the pressing roller 61 is employed in the pressing unit 60, the number or the disposition of the pressing roller 61 is not limited, and it is possible to have an arbitrary configuration within a range where the above-described operation is achieved.

Furthermore, between the pressing roller 61 of the pressing unit 60 and the heating roller 51 of the heating unit 50, a member with which the web W can come into contact is only the guide G which functions as a web receiving member that can support the web W from below. Therefore, the distance between the pressing roller 61 and the heating roller 51 can be shortened. In addition, since the pressed web W is quickly heated and pressed, it is possible to suppress a spring back of the web W, and to form the sheet having high strength.

When the pressing unit 60 (pressing roller 61) and the heating unit 50 (heating roller 51) are provided the above-described configuration, the pressing unit 60 and the heating unit 50 are for the sheet which is thin and has a high density and high strength. For example, the pressing unit 60 and the heating unit 50 are for the paper sheet rather than the nonwoven fabric.

1.5.9. Heating Unit

The sheet manufacturing apparatus 120 of the embodiment is provided with the heating unit 50. The heating unit 50 is provided on the further downstream side than the above-described pressing unit 60.

The heating unit 50 heats the mixture which is mixed in the above-described mixing unit 30, and bonds the plurality of fibers to each other via the additive agent. In addition, when the moisture is added in the mixture, a state where the hydrogen bonding is formed between the fibers may be formed. The mixture of which the moisture is adjusted, may be formed, for example, in a web shape. In addition, the heating unit 50 may have a function of forming the mixture in a predetermined shape.

In the specification, an expression "bond the plurality of fibers to each other via the additive agent" means a state where the fibers and the additive agent in the defibrated material are unlikely to be separated from each other or a state where the resin of the additive agent is disposed between the fibers, and it is difficult to separate the fibers from each other via the additive agent. In addition, the bonding is a concept which includes adhesion, and includes a state where two or more types of objects are in contact with each other and unlikely to be separated from each other. In addition, when the fibers are bonded to each other via the complex body, the fibers may be parallel to each other and intersect each other, or the plurality of fibers may be bonded to one fiber. In addition, an expression "the fiber is hydrogen-bonded" means that the plurality of fibers are combined (bonded) to each other partially or entirely by the hydrogen bonding.

In a case where the resin which is one of the constituent components of the additive agent is the thermoplastic resin, if heating is performed to reach a glass transfer temperature (softening point) or a temperature which is equal to or greater than the vicinity of a melting point, the resin is softened or melted, and after this, when the temperature decreases, the resin is hardened. As the resin is hardened, comes into contact with the fibers to be intertwined, and is solidified, it is possible to bond the fibers and the additive agent to each other. In addition, as other fibers are bonded when the resin is solidified, the fibers are bonded to each other. In addition, it is preferable that the glass transfer temperature, the melting point, or the softening point of the resin is lower than a decomposition temperature and a carbonization temperature of the fibers, and in order to achieve such a relationship, it is preferable to select by combining both types of the resin and fibers.

Meanwhile, when the moisture is adjusted downstream of the deposition unit 75, the heating unit 50 partially or entirely evaporates the moisture included in the mixture. Accordingly, water molecules which are interposed between the fibers is reduced (removed). According to this, it is possible to form the hydrogen bonding between the fibers. Therefore, it is preferable that the heating unit 50 is set to a temperature which is equal to or greater than a boiling point of the water, but if it is possible to form the hydrogen bonding, the heating unit 50 may be a unit which heats the temperature to the temperature which is equal to or less than the boiling point of the water.

In addition, in the heating unit 50, pressure may be applied in addition to applying the heat to the mixture. In this case, according to a target state of the sheet S, the heating unit 50 has a function of forming the mixture in a predetermined shape. The level of the applied pressure is appropriately adjusted by the type of the sheet S to be formed, but can be 100 kPa to 1 MPa. If the applied pressure is low, it is possible to obtain a sheet having a high porosity, and if the applied pressure is high, it is possible to obtain a sheet having a low porosity (high density).

Specific examples of the heating unit 50 include a heating roller (heater roller), a heat press forming machine, a hot plate, a warm air blower, an infrared heater, or a flash fixing device. In the sheet manufacturing apparatus 120 of the embodiment illustrated in FIG. 1, the heating unit 50 is configured of the heating roller 51. In the example of the drawing, the heating unit 50 heats the pressed web W by the pressing unit 60. In addition, the heating unit 50 may have a function of pressing the web W. By heating the web W, it is possible to bond the fibers included in the web W to each other via the additive agent and the hydrogen bonding.

In the example in the drawing, the heating unit 50 is configured to nip the web W by the rollers, heat the web W, and press the web W, and includes one pair of heating rollers 51. Each of the pair of heating rollers 51 is parallel to the center axis. In addition, the heating unit 50 can be configured of the rollers or the like, and the heating unit 50 can also be configured of a planar pressing unit. Here, detail description thereof will be omitted, but when the planar pressing unit is used as the heating unit 50, this case is for a relatively thick sheet, for example, the non-woven fabric having a low density. Since the contact time with respect to the web W takes longer in a case where the planar pressing unit is used compared to a case where the heating roller is used, this case is for a sheet which is thick and takes time to transfer the heat to the entire web. In addition, the pressing unit 60 may not be provided on an upstream side of the planar pressing unit. In this case, since the compression to have a high density by the pressing unit 60 is not performed, this case is for the sheet which has a relatively low density. When the planar pressing unit is used, this case is for the non-woven fabric rather than the paper sheet.

The heating unit 50 is provided with the first heating unit 50a which is disposed on the upstream side of the web W in the transfer direction, and the second heating unit 50b which is disposed on the downstream side of the first heating unit 50a, and each of the first heating unit 50a and the second heating unit 50b is provided with one pair of heating rollers 51. In addition, between the first heating unit 50a and the second heating unit 50b, the guide G which assists the transfer of the web W is disposed.

In addition, in the center unit of a core bar, as the heating section, a heating material which is not illustrated, such as a halogen heater, is provided. The heating roller 51 and the heating material respectively obtain the temperature by a temperature detecting unit which is not illustrated based on the obtained temperature, and are controlled by an ON-OFF control of the heating material or a control of electric energy. Accordingly, it is possible to retain the surface temperature of the heating roller 51 to be a predetermined temperature. By allowing the web W to pass through between the heating rollers 51, it is possible to heat and press the transferred web W. In addition, the heating section is not limited to the halogen heater or the like, and for example, a heating section by a non-contact heater or a heating section by warm air may be employed.

In addition, the heating unit 50 which is illustrated in the drawing is an example of a case where two pairs of heating rollers 51 are provided. However, the number or the disposition of the heating rollers 51 is not limited, and it is possible to be arbitrarily configured within a range where the above-described operation is achieved. In addition, the configuration (thickness or material of a releasing layer, an elastic layer, and a core bar, outer diameter of the roller) of the heating rollers 51 of each heating unit 50, or a load applied by pressure-welding the heating roller 51, may vary according to each heating unit 50.

As described above, as passing the heating unit 50 (heating process), the resin included in the additive agent is melted, easily becomes entangled with the fibers in the defibrated material, and the fibers are bonded to each other. In addition, the fibers may be combined to each other by the hydrogen bonding. The mixture of the defibrated material and the additive agent becomes the sheet S by passing the heating unit 50.

1.5.10. Cutting Unit

In the sheet manufacturing apparatus 120 of the embodiment, on a downstream side of the heating unit 50, a first cutting unit 90a and a second cutting unit 90b are disposed as the cutting unit 90 which cuts the sheet S in a direction which intersects the transfer direction of the web W (the web W which passes the heating unit 50 is the sheet S). The cutting unit 90 can be provided as necessary.

The first cutting unit 90a is provided with a cutter, and cuts out the sequential sheet S in a sheet shape along a cutting position which is set to have a predetermined length. In addition, on the further downstream side of the sheet S in the transfer direction than the first cutting unit 90a, the second cutting unit 90b is disposed to cut the sheet S along the transfer direction of the sheet S. The second cutting unit 90b is provided with a cutter, and cuts out (cuts) the sheet S along a predetermined cutting position in the transfer direction of the sheet S. Accordingly, the sheet S having a desired size is formed. The cut sheet S is loaded on a stacker 95 or the like after marking is performed one by one by the marking unit 100.

1.5.11. Marking Unit

In the sheet manufacturing apparatus 120 of the embodiment, the marking unit 100 is disposed on the further downstream side than the sheet forming unit 40. The marking unit 100 can perform marking for distinguishing the history of the sheet S, with respect to the sheet S. When manufacturing the sheet S, marking unit 100 may perform marking which has information that corresponds to the number of recycling of the sheet S into the raw material 1. The marking may be a mark with the same number as the number of recycling.

The marking unit 100 can perform marking on the sheet S which is cut by the cutting unit 90 one by one. The position where the marking is performed in the sheet S can be appropriately selected within a range where the making is recognized by the obtaining unit 8.

Regarding a state of marking in the sheet S, if the state can be detected in the obtaining unit 8, the appropriately known state of marking can be employed. When the obtaining unit 8 is an optical reading device, the marking unit 100 can employ a method of (1) opening a fine hole on the sheet S, (2) performing printing by the ink which cannot be read by the eyes of a human, (3) performing embossing processing with a slight unevenness on the sheet S, and (4) printing a bar code which can put in multiple pieces of information.

In addition, as described above, as the information regarding the history of the raw material 1, which is included in the marking, it is possible to include the number of recycles, a compound amount of the additive agent, or a compound amount of additional fibers.

When the sheet S on which marking is performed is recycled as the raw material 1 in this manner, the history may be obtained by reading the marking by the obtaining unit 8, and the control unit 110 may control the feed amount of the additive agent in the addition unit 32 in accordance with the obtained history. In this manner, by using the marking, it is possible to understand the history of the raw material 1, such as the number of recycling.

1.5.12. Control Unit

Based on the information regarding the history of the raw material 1, which is output from the obtaining unit 8, the control unit 110 changes the condition of the addition unit 32. Specifically, when the information regarding the history of the raw material 1, which is output from the obtaining unit 8, for example, the number of recycles, is 0, the control unit 110 can set the amount of the additive agent to be added in the addition unit 32 to a first amount which is necessary for manufacturing the sheet S. In addition, when the number of recycles is 1, the control unit 110 can set the amount of the additive agent to a second amount which is smaller than the first amount. In addition, based on the information regarding the history of the raw material 1, the control unit 110 does not change the amount of the additive agent immediately. The amount of the additive agent is changed after the time for performing processing and transferring the raw material 1 of which the history is obtained up to a place where the additive agent is added elapses.

In addition, based on the information regarding the history of the raw material 1, which is obtained from the obtaining unit 8, the control unit 110 may select the type of the raw material 1 which is supplied from the supplying unit 9. Specifically, when the plurality of types of raw materials 1 is stored in the supplying unit 9, it is possible to select the raw material 1 which is within a range where manufacturing is possible with the same or the same level of feed amount of the additive agent, and to supply the raw material 1 to the crushing unit 10.

Furthermore, based on the information regarding the history of the raw material 1, which is obtained from the obtaining unit 8, the control unit 110 may change the condition of the marking unit 100. Specifically, when the information regarding the history of the raw material 1, which is obtained from the obtaining unit 8, is the number of recycles, it is possible to send the command to the marking unit 100 to perform marking which corresponds to the number which is added by 1 to the number of recycles.

In addition, the control unit 110 can perform the control of each unit in the sheet manufacturing apparatus 120 from the obtaining unit 8 which is at an upstream end up to the marking unit 100 which is at a downstream end.

For example, the control unit 110 is configured of a main control unit or a motor driving unit, an operation panel (operating unit), or a processing unit. A display unit displays each condition (for example, pressure of the pressing unit 60, or the like) that is selected by the user. The operating unit is a unit for inputting the operation or the like of the user as data. The operating unit is realized by hardware, such as a key board or a touch panel. The processing unit performs various types of processing, based on operation data from the operating unit or a program. The processing unit is realized, for example, by various processors (CPU, DSP, or the like), hardware, such as ASIC (gate array or the like), an application program, or an OS (for example, a general-purpose OS).

1.5.13. Others

In addition, although not illustrated in the drawing, downstream of the heating unit 50, a cooling unit which cools the sheet S heated by the heating unit 50 may be provided. The cooling unit can be configured of a cooling roller or the like. By providing the cooling unit, it is possible to rapidly cool the resin, and to solidify the structure of the sheet S in an early stage. Accordingly, for example, it is possible to contribute to improving the throughput of the apparatus and to making the size of the apparatus small.

As the sheet manufacturing apparatus 120 of the embodiment can have a configuration other than the above-described configurations, and to appropriately have a plurality of configurations including the above-described configuration in accordance with a purpose. The number of order of each configuration is not particularly limited, and it is possible to appropriately design the configurations in accordance with the purpose.

The history of the raw material may be input by the user. In addition, the sheet manufacturing apparatus 120 of the embodiment is an apparatus which manufactures the sheet S by the dry method, but is not limited thereto, and may be a manufacturing apparatus by the wet method.

2. SHEET MANUFACTURING METHOD

A sheet manufacturing method of the embodiment is a manufacturing method of the sheet S by defibrating the raw material 1 including at least the fibers, adding the additive agent to the defibrated material, and bonding the plurality of fibers to each other via the additive agent. According to the history of the raw material 1, the feed amount of the additive agent with respect to the raw material 1 varies.

The sheet manufacturing method of the embodiment can be performed by using the above-described sheet manufacturing apparatus 120. Since the raw material, the defibration, the defibrated material, the fibers, mixing, the additive agent, the resin, the fibers, the sheet forming, or the like are similar to those described in the above-described sections of the sheet manufacturing apparatus, the detail description thereof will be omitted.

According to the sheet manufacturing method, by varying the amount of the additive agent according to the history of the raw material 1, it is possible for the additive agent in the sheet S to be set to be of a desired amount. For example, when the sheet S has been recycled twice, the amount of the additive agent included in the defibrated material varies every time recycling is performed. However, by doing so, it is possible for the amount of the additive agent in the manufactured sheet S to be set to be of a desired amount.

3. OTHER ITEMS

In the specification, an expression "uniform" indicates that, in a case of uniform scattering or mixing, in an object which defines two or more types or two or more phases of components, a relative position where one component exists with respect to other components is similar in the entire system, or the positions are the same or substantially equivalent to each other in each part of the system. In addition, uniformity of coloring or uniformity of the color tone indicates that there is no light and shade of the light when the sheet is viewed in a plan view, and a tone density is similar. However, even when the tone density is similar, there is a case where the distances between all of the resins are not the same, and the tone density is not completely the same as each other.

In the specification, terms which mean the equivalence of the density, the distance, or the dimension, such as "uniform", "the same", or "equivalent interval", are used. It is preferable that the density, the distance, or the dimension is equivalent, but since it is difficult to be completely equivalent, these terms also include a meaning that the values are not equivalent and shifted by an accumulation of errors or irregularities.

The invention is not limited to the above-described embodiment, and further, it is possible to have various modifications. For example, the invention includes substantially the same configuration (a configuration in which the functions, the methods, and the result are the same, or a configuration in which the purpose and the effect are the same) as the described configuration in the embodiment. In addition, the invention includes a configuration in which a part which is not essential in the configuration described in the embodiment is switched. In addition, the invention includes a configuration in which the same operation effect as that of the configuration described in the embodiment is achieved, or a configuration in which the same purpose can be achieved. In addition, the invention includes a configuration in which a known technology is added to the configuration described in the embodiment. For example, the web W is a single layer in the above-described embodiment, but may be plural layers, and may be a layer in which additionally created non-woven fabric or paper sheet is stacked.

4. EXAMPLE

Hereinafter, by illustrating Examples, the invention will be described in more detail. In addition, the invention is not limited to the Examples described below.

In Examples 1 and 2 described below, by using the sheet manufacturing apparatus (for example, the sheet manufacturing apparatus 120 provided with the resin feeding unit 32a and the fiber feeding unit 32b illustrated in FIG. 2) according to the invention, a regenerated paper sheet for business is manufactured as the sheet S. FIG. 4 is a table illustrating the additive agent or the like and a regenerated material in each Example.

4.1. Manufacturing Raw Material

First, the raw material which is used in Example 1 is manufactured. Here, as illustrated in FIGS. 2 and 4, the printed waste paper sheet (waste paper which is printed) of the copy paper sheet for business manufactured by the wet method, is supplied from the supplying unit 9 as an initial raw material. Since the printed waste paper sheet does not have the history of the raw material, the number of recycling as the raw material is 0. By using the shredder as the crushing unit 10, the raw material (printed waste paper sheet) supplied from the supplying unit 9 is cut out into small pieces having approximately 6 mm×14 mm.

By using the defibrating machine as the defibrating unit 20, the raw material which is cut out in the crushing unit 10 is defibrated. The rotational speed (rotational speed of the rotary unit of the defibrating unit 20) of the defibrating unit 20 is 5000 rpm.

By using the cyclone as the classifying unit 63, the defibrated material which passes through the defibrating unit 20 is classified.

By using the rotary sieve as the screening unit 35, the classified material which passes through the classifying unit 63 is screened by the length of the fibers. As the net of the screening unit 35, a net having 970 μm in aperture is used.

In the mixing unit 30, with respect to 100 parts by weight of the defibrated material (fibers) which passes through the screening unit 35, 15 parts by weight of the resin powder which are supplied from the resin feeding unit 32a of the addition unit are mixed in. In the mixing unit 30, by using a turbo fan blower, the defibrated material and the resin are mixed in the air. The screw feeder is used as the resin feeding unit 32a. The resin powder having the average grain size D50=10 μm which is made by integrating titanium oxide with polyester resin, is used.

By using the rotary sieve as a refining unit 70, the mixture which is mixed in the mixing unit 30 is refined. As the net of the refining unit 70, the net having 970 μm in aperture is used.

While operating the suction mechanism 78 of the deposition unit 75, and moving the mesh belt 76, the defibrated material which passes through the refining unit 70 is deposited on the mesh belt 76. After this, the web W which is deposited on the mesh belt 76 is carried to the pressing unit 60.

The web W is pressed by the appropriate pressing force by the pressing roller 61 in the pressing unit 60, and is heated to the temperature which is equal to or greater than the temperature at which the resin in the additive agent is melted by two pairs of the heating rollers 51 in the heating unit 50.

Furthermore, the web W is cut out to have the A4 size in the cutting unit 90. After this, the information which corresponds to the number of recycles 1 is given the marking by the marking unit 100.

By the above-described process, as the raw material which is used in Example 1, the copy paper sheet for business which is the regenerated material is manufactured.

4.2. Example 1

In Example 1, as illustrated in FIG. 4, by using the copy paper sheet for business which is manufactured in the above-described 4.1 as the raw material, similarly, the copy paper sheet for business is manufactured. In this case, the number of recycling of the raw material is 1. With respect to 100 parts by weight of the defibrated material (fibers), the amount of the resin powder which is added to the defibrated material in the resin feeding unit 32a is 10 parts by weight, and the information which corresponds to the number of recycles 2 is given the marking by the marking unit 100. Except these, the process is similar to the manufacturing process of the above-described 4.1.

A part of the resin which is added in the above-described 4.1 is not completely removed by the defibrating unit 20 and the classifying unit 63, and is adhered to the fibers of the defibrated material which is classified by the classifying unit 63. However, as the amount of the resin powder is 10 parts by weight which is less than that in the above-described 4.1 by 5 parts by weight, in Example 1, the copy paper sheet for business which has the same function as that of the paper sheet manufactured in the above-described 4.1 can be manufactured.

4.3. Example 2

In Example 2, as illustrated in FIG. 4, by using the copy paper sheet for business which is manufactured in Example 1 as the raw material, similarly, the copy paper sheet for business is manufactured. In this case, the number of recycling of the raw material is 2. With respect to 95 parts by weight of the defibrated material (fibers), the amount of the resin powder which is added to the defibrated material in the resin feeding unit 32a is 10 parts by weight, and 5 parts by weight of fibers is fed from the fiber feeding unit 32b. Except these, the process is similar to the manufacturing process of the above-described 4.1. By feeding 5 parts by weight of fibers from the fiber feeding unit 32b with respect to 95 parts by weight of the defibrated material (fibers), the total is 100 parts by weight of fibers.

The fibers which are fed from the fiber feeding unit 32b uses the same defibrated material as the defibrated material which passes through the screening unit 35 in the above-described 4.1.

Since a part of the resin is adhered to the fibers of the defibrated material which is classified by the classifying unit 63, by the same level of amount as that of the fibers used in Example 1, in Example 2, the amount of the resin powder is 10 parts by weight which is the same as in Example 1. In addition, since the fiber of the defibrated material which is classified by the classifying unit 63 are mixed with the fibers which deteriorate and have a short fiber length, in Example 2, by reducing the amount of the defibrated material to 95 parts by weight and adding 5 parts by weight of fibers, the copy paper sheet for business which has the same function as that of the paper sheet manufactured in the above-described 4.1 can be manufactured.

The entire disclosure of Japanese Patent Application No. 2014-061554, filed Mar. 25, 2014 is expressly incorporated by reference herein.

What is claimed is:

1. A sheet manufacturing apparatus, comprising:
  an obtaining unit which obtains a history of raw material, which has been added to the raw material, the history indicating information on the number of times the raw material has been recycled, the raw material including fibers;
  a defibrating unit which defibrates the raw material into defibrated fibers, the defibrating unit being arranged downstream relative to the obtaining unit in a transfer direction of the raw material;
  an addition unit which adds an additive agent to a defibrated material including the defibrated fibers which have been defibrated in the defibrating unit, the addition unit being arranged downstream relative to the defibrating unit in a transfer direction of the defibrated material;
  a sheet forming unit which forms a sheet by bonding the defibrated fibers to each other via the additive agent, the sheet forming unit being arranged downstream relative to the addition unit in the transfer direction of the defibrated material; and
  a controller which is electrically connected to the obtaining unit and the addition unit, and controls the addition unit to add the additive agent such that an amount of the additive agent to be added to the defibrated material varies according to the history of the raw material, which has been obtained at the obtaining unit.

2. The sheet manufacturing apparatus according to claim 1, wherein the controller controls the addition unit to decrease the amount of the additive agent to be added to the defibrated material as the number of times the raw material has been recycled increases.

3. The sheet manufacturing apparatus according to claim 1, wherein
  the addition unit further adds additional fibers into the defibrated material which has been defibrated in the defibrating unit,
  wherein the controller controls the addition unit to increase an amount of the additional fibers added by the addition unit as the number of times the raw material has been recycled increases.

4. The sheet manufacturing apparatus according to claim 1, further comprising:
  a marking unit which performs marking on the sheet that has been formed at the sheet forming unit to add, to the sheet, information on the number of times the raw material has been recycled when the sheet is manufactured using the raw material, the marking unit being arranged downstream relative to the sheet for forming unit in a transfer direction of the sheet.

5. The sheet manufacturing apparatus according to claim 1, wherein the addition unit includes a resin feeding unit which feeds resin as the additive agent into the defibrated material including the defibrating fibers, and
  the controller controls the resin feeding unit to decrease an amount of the resin to be added to the defibrated material as the number of times the raw material has been recycled increases.

6. The sheet manufacturing apparatus according to claim 5, wherein the addition unit further includes a fiber feeding unit which feeds additional fibers into the defibrated material including the defibrating fibers, and
  the controller controls the fiber feeding unit to increase an amount of the additional fibers fed by the fiber feeding unit as the number of times the raw material has been recycled increases.

7. The sheet manufacturing apparatus according to claim 1, wherein the obtaining unit includes an optical sensor which reads out the information on the number of times the raw material has been recycled by emitting light to the history added to the raw material.

8. The sheet manufacturing apparatus according to claim 7, wherein the history is a marking which is added to the raw material and which the optical sensor reads out.

9. A sheet manufacturing apparatus, comprising:
  an operating unit through which a user inputs a history of raw material, the history indicating information on the number of times the raw material has been recycled, the raw material including fibers;
  a defibrating unit which defibrates the raw material into defibrated fibers;
  an addition unit which adds an additive agent to a defibrated material including the defibrated fibers which have been defibrated in the defibrating unit, the addition unit being arranged downstream relative to the defibrating unit in a transfer direction of the defibrated material;

a sheet forming unit which forms a sheet by bonding the defibrated fibers to each other via the additive agent, the sheet forming unit being arranged downstream relative to the addition unit in the transfer direction of the defibrated material; and a controller which is electrically connected to the operating unit and the addition unit, and controls the addition unit to add the additive agent such that an amount of the additive agent to be added to the defibrated material varies according to the history of the raw material, which has been input at the operating unit.

10. A sheet manufacturing method, comprising:

obtaining a history of raw material, which has been added to the raw material, or obtaining the history of the raw material through an input of a user, the history indicating information on the number of times the raw material has been recycled, the raw material including fibers;

defibrating the raw material into defibrated fibers;

adding an additive agent to a defibrated material including the defibrated fibers that have been defibrated;

bonding the defibrated fibers to each other via the additive agent; and controlling adding of the additive agent such that a feed amount of the additive agent with respect to the defibrated material varies according to the history of the raw material, which has been obtained.

\* \* \* \* \*